(12) United States Patent
Geiger et al.

(10) Patent No.: US 12,342,302 B2
(45) Date of Patent: Jun. 24, 2025

(54) DEVICES AND METHODS FOR SYNCHRONIZING TRANSCEIVER DEVICES TO SIMULTANEOUSLY CAPTURE DATA ACROSS MULTIPLE ADVERTISEMENT CHANNELS

(71) Applicant: ZEBRA TECHNOLOGIES CORPORATION, Lincolnshire, IL (US)

(72) Inventors: Edward W. Geiger, San Martin, CA (US); Yu Wan, Cupertino, CA (US); Janakiraman Gopalan, Cupertino, CA (US); Richard Lawerance Woodburn, Cupertino, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 435 days.

(21) Appl. No.: 17/972,805

(22) Filed: Oct. 25, 2022

(65) Prior Publication Data

US 2024/0137880 A1 Apr. 25, 2024
US 2024/0236885 A9 Jul. 11, 2024

(51) Int. Cl.
*H04W 4/80* (2018.01)
*H04W 48/16* (2009.01)
*H04W 56/00* (2009.01)

(52) U.S. Cl.
CPC ....... *H04W 56/0015* (2013.01); *H04W 48/16* (2013.01); *H04W 56/005* (2013.01)

(58) Field of Classification Search
CPC ....... H04W 4/029; H04W 4/027; H04W 4/80; H04W 76/18; H04W 76/14; H04W 76/25; H04W 84/18; H04W 56/0015; H04W 48/16; H04W 56/005
See application file for complete search history.

(56) References Cited

U.S. PATENT DOCUMENTS 9,285,454 B2 3/2016 Boyd et al.
2009/0210141 A1* 8/2009 Young .................. G08G 1/0125
                                                                701/119
2013/0178163 A1 7/2013 Wang
(Continued)

OTHER PUBLICATIONS

International Search Report and Written Opinion for International Application No. PCT/US2023/34463 mailed on Feb. 8, 2024.

*Primary Examiner* — Cindy Trandai

(57) ABSTRACT

Radio transceiver devices and methods are disclosed herein. An example transceiver device includes at least one processor, a plurality of radio transceivers, and a memory. The memory may store instructions that, when executed by the at least one processor, cause the transceiver device to cause the plurality of radio transceivers to scan over each of a plurality of advertisement channels during a first period; and during a second period of the scan period, cause the plurality of radio transceivers to scan over each of the plurality of advertisement channels. The instruction may further cause the transceiver device to receive a beacon data packet including beacon information that is associated with a beacon device disposed proximate to the transceiver device, and wherein the beacon data packet includes beacon information captured during the first period and the second period.

20 Claims, 4 Drawing Sheets

(56) References Cited

U.S. PATENT DOCUMENTS

| | | | |
|---|---|---|---|
| 2014/0269560 A1* | 9/2014 | Jain | H04L 5/0044 |
| | | | 370/329 |
| 2015/0264139 A1* | 9/2015 | Son | H04L 67/1001 |
| | | | 709/208 |
| 2015/0382304 A1* | 12/2015 | Park | H04W 56/001 |
| | | | 455/41.2 |
| 2017/0026905 A1* | 1/2017 | Denboer | H04W 4/80 |
| 2017/0034647 A1* | 2/2017 | Takeuchi | H04W 76/15 |
| 2017/0272270 A1* | 9/2017 | Gu | H04B 17/318 |
| 2018/0137702 A1 | 5/2018 | Padgett et al. | |
| 2018/0184380 A1 | 6/2018 | Xue | |
| 2019/0327675 A1* | 10/2019 | Takeuchi | H04W 76/14 |
| 2021/0112392 A1* | 4/2021 | Ganick | H04W 76/14 |
| 2023/0396959 A1* | 12/2023 | Naik | H04W 4/027 |

\* cited by examiner

DEVICES AND METHODS FOR SYNCHRONIZING TRANSCEIVER DEVICES TO SIMULTANEOUSLY CAPTURE DATA ACROSS MULTIPLE ADVERTISEMENT CHANNELS

BACKGROUND

Digital technology is rapidly taking over today's industrial networks for locationing services. Those entities able to leverage this technology will generally have a performance edge over their competition. More specifically, location data insight has quickly developed into a necessary component of entities seeking to track locations and statuses of their assets, enhance the productivity of their workers, and to generally optimize workflows. As such, development of devices that reliably provide cost-effective, proximity-based asset visibility solutions, and that are simultaneously easy to deploy, simple to manage, and secure are a topic of great interest in the field of industrial networking.

However, conventional locationing devices/systems suffer from drawbacks that prevent them from providing such reliable, effective, and secure locationing services. Namely, conventional locationing devices/systems are unable to reliably detect advertisement packets from beacon devices. These beacon devices typically transmit data across a rotation of multiple advertisement channels during an advertisement period of relatively short duration. Receiving these advertisement signals thus requires the receiving device to be scanning on the same advertisement channel across which the advertisement was transmitted at the moment the advertisement signal reaches the receiving device. The relatively short duration of advertisement periods combined with the strict timing/channel requirements for the receiver device to receive the advertisement packet creates a significant challenge for conventional locationing devices/systems. Consequently, conventional locationing devices suffer from issues that reduce the efficiency and general timeliness of information delivery between devices, and also reduce the robustness of data capture possible from beacon devices, which results in a less effective locationing system.

Thus, there is a need for devices and methods for synchronizing transceiver devices to simultaneously capture data across multiple advertisement channels in manner that allows for fast, efficient, and reliable networking data transmission across a wide variety of user devices within a networking system.

SUMMARY

In an embodiment, the present invention is a transceiver device. The transceiver device may comprise: at least one processor; a plurality of radio transceivers; and a memory storing instructions that, when executed by the at least one processor, cause the beacon device to: cause the plurality of radio transceivers to scan over each of a plurality of advertisement channels during a first period of a scan period such that each of the plurality of radio transceivers scans over one of the plurality of advertisement channels that is different from other advertisement channels scanned by other radio transceivers during the first period, during a second period of the scan period, cause the plurality of radio transceivers to scan over each of the plurality of advertisement channels such that each of the plurality of radio transceivers scans over a second one of the plurality of advertisement channels that is different from other advertisement channels scanned by other radio transceivers during the second period, and receive, by the plurality of radio transceivers, a beacon data packet including beacon information that is associated with a beacon device disposed proximate to the transceiver device, and wherein the beacon data packet includes beacon information captured during the first period and the second period.

In a variation of this embodiment, the instructions, when executed, further cause the transceiver device to: during a third period of the scan period, cause the plurality of radio transceivers to scan over each of the plurality of advertisement channels such that each of the plurality of radio transceivers scans over a third one of the plurality of advertisement channels that is different from other advertisement channels scanned by other radio transceivers during the third period, and receive, by the plurality of radio transceivers, the beacon data packet including beacon information that is associated with the beacon device disposed proximate to the transceiver device, and wherein the beacon data packet includes beacon information captured during the first period, the second period, and the third period. Further in this variation, the plurality of radio transceivers includes a first Bluetooth Low Energy (BLE) radio transceiver, a second BLE transceiver, and a third BLE transceiver; and the plurality of advertisement channels includes a first BLE advertisement channel, a second BLE advertisement channel, and a third BLE advertisement channel.

In another variation of this embodiment, the instructions, when executed, further cause the transceiver device to: generate, by a first radio transceiver at a beginning of the first period, a synchronization pulse that is transmitted to other radio transceivers of the plurality of radio transceivers; and upon receipt of the synchronization pulse at a second radio transceiver, activate a timer configured to expire at a beginning of the second period. Further in this variation, the scan period includes a third period, the plurality of radio transceivers includes a third radio transceiver, and the instructions, when executed, further cause the transceiver device to: upon receipt of the synchronization pulse at the third radio transceiver, activate a second timer configured to expire at a beginning of the third period; at the beginning of the second period and synchronous with the timer expiring, the second radio transceiver scans an advertisement channel previously scanned by the first radio transceiver during the first period; and at the beginning of the third period and synchronous with the second timer expiring, the third radio transceiver scans the advertisement channel previously scanned by the first radio transceiver during the first period and the second radio transceiver during the second period. Still further in this variation, the instructions, when executed, further cause the transceiver device to: generate, by the second radio transceiver at an ending of the second period, an ending pulse for transmission to the first radio transceiver; and automatically adjust, by the first radio transceiver, the beginning of the first period during a subsequent iteration of the scan period based on delays indicated by the ending pulse.

In yet another variation of this embodiment, the instructions, when executed, further cause the transceiver device to: generate, by each of the plurality of radio transceivers, an updated beacon data packet including (i) the beacon information captured during the first period or the second period and (ii) a channel flag indicating which advertisement channel of the plurality of advertisement channels the each of the plurality of radio transceivers was scanning when the each of the plurality of radio transceivers captured the beacon information; and adjust (i) an antenna gain profile for at least one radio transceiver of the plurality of radio transceivers or (ii) a gain profile of the beacon data packet based on the updated beacon data packet.

In still another variation of this embodiment, the scan period includes a third period; the scan period is 500 milliseconds (ms); and each of the first period, the second period, and the third period are one-third of 500 ms.

In another embodiment, the present invention is a method for synchronizing transceiver devices to simultaneously capture data across multiple advertisement channels. The method may comprise: causing a plurality of radio transceivers to scan over each of a plurality of advertisement channels during a first period of a scan period such that each of the plurality of radio transceivers scans over one of the plurality of advertisement channels that is different from other advertisement channels scanned by other radio transceivers during the first period; during a second period of the scan period, causing the plurality of radio transceivers to scan over each of the plurality of advertisement channels such that each of the plurality of radio transceivers scans over a second one of the plurality of advertisement channels that is different from other advertisement channels scanned by other radio transceivers during the second period; and receiving, by the plurality of radio transceivers, a beacon data packet including beacon information that is associated with a beacon device disposed proximate to the transceiver device, and wherein the beacon data packet includes beacon information captured during the first period and the second period.

In a variation of this embodiment, the method further comprises: during a third period of the scan period, causing the plurality of radio transceivers to scan over each of the plurality of advertisement channels such that each of the plurality of radio transceivers scans over a third one of the plurality of advertisement channels that is different from other advertisement channels scanned by other radio transceivers during the third period, and receiving, by the plurality of radio transceivers, the beacon data packet including beacon information that is associated with the beacon device disposed proximate to the transceiver device, and wherein the beacon data packet includes beacon information captured during the first period, the second period, and the third period. Further in this variation, the plurality of radio transceivers includes a first Bluetooth Low Energy (BLE) radio transceiver, a second BLE transceiver, and a third BLE transceiver; and the plurality of advertisement channels includes a first BLE advertisement channel, a second BLE advertisement channel, and a third BLE advertisement channel.

In another variation of this embodiment the method further comprises: generating, by a first radio transceiver at a beginning of the first period, a synchronization pulse that is transmitted to other radio transceivers of the plurality of radio transceivers; and upon receipt of the synchronization pulse at a second radio transceiver, activating a timer configured to expire at a beginning of the second period. Further in this variation, the scan period includes a third period, the plurality of radio transceivers includes a third radio transceiver, and the method further comprises: upon receipt of the synchronization pulse at the third radio transceiver, activating a second timer configured to expire at a beginning of the third period; at the beginning of the second period and synchronous with the timer expiring, scanning, by the second radio transceiver, an advertisement channel previously scanned by the first radio transceiver during the first period; and at the beginning of the third period and synchronous with the second timer expiring, scanning, by the third radio transceiver, the advertisement channel previously scanned by the first radio transceiver during the first period and the second radio transceiver during the second period. Still further in this variation, the method further comprises: generating, by the second radio transceiver at an ending of the second period, an ending pulse for transmission to the first radio transceiver; and automatically adjusting, by the first radio transceiver, the beginning of the first period during a subsequent iteration of the scan period based on delays indicated by the ending pulse.

In yet another variation of this embodiment, the method further comprises: generating, by each of the plurality of radio transceivers, an updated beacon data packet including (i) the beacon information captured during the first period or the second period and (ii) a channel flag indicating which advertisement channel of the plurality of advertisement channels the each of the plurality of radio transceivers was scanning when the each of the plurality of radio transceivers captured the beacon information; and adjusting (i) an antenna gain profile for at least one radio transceiver of the plurality of radio transceivers or (ii) a gain profile of the beacon data packet based on the updated beacon data packet.

In yet another embodiment, the present invention is a tangible machine-readable medium comprising instructions for synchronizing transceiver devices to simultaneously capture data across multiple advertisement channels that, when executed, cause a machine to at least: cause a plurality of radio transceivers to scan over each of a plurality of advertisement channels during a first period of a scan period such that each of the plurality of radio transceivers scans over one of the plurality of advertisement channels that is different from other advertisement channels scanned by other radio transceivers during the first period; during a second period of the scan period, cause the plurality of radio transceivers to scan over each of the plurality of advertisement channels such that each of the plurality of radio transceivers scans over a second one of the plurality of advertisement channels that is different from other advertisement channels scanned by other radio transceivers during the second period; and receive, by the plurality of radio transceivers, a beacon data packet including beacon information that is associated with a beacon device disposed proximate to the transceiver device, and wherein the beacon data packet includes beacon information captured during the first period and the second period.

In a variation of this embodiment, the instructions, when executed, further cause the machine to: during a third period of the scan period, cause the plurality of radio transceivers to scan over each of the plurality of advertisement channels such that each of the plurality of radio transceivers scans over a third one of the plurality of advertisement channels that is different from other advertisement channels scanned by other radio transceivers during the third period; and receive, by the plurality of radio transceivers, the beacon data packet including beacon information that is associated with the beacon device disposed proximate to the transceiver device, and wherein the beacon data packet includes beacon information captured during the first period, the second period, and the third period.

In another variation of this embodiment, the instructions, when executed, further cause the machine to: generate, by a first radio transceiver at a beginning of the first period, a synchronization pulse that is transmitted to other radio transceivers of the plurality of radio transceivers; upon receipt of the synchronization pulse at a second radio transceiver, activate a timer configured to expire at a beginning of the second period; generate, by the second radio transceiver at an ending of the second period, an ending pulse for transmission to the first radio transceiver; and automatically adjust, by the first radio transceiver, the beginning of the first period during a subsequent iteration of the scan period based on delays indicated by the ending pulse. Further in this variation, the scan period includes a third period, the plurality of radio transceivers includes a third radio transceiver, and the instructions, when executed, further cause the machine to: upon receipt of the synchronization pulse at the third radio transceiver, activate a second timer configured to expire at a beginning of the third period; at the beginning of the second period and synchronous with the timer expiring, scan, by the second radio transceiver, an advertisement channel previously scanned by the first radio transceiver during the first period; and at the beginning of the third period and synchronous with the second timer expiring, scan, by the third radio transceiver, the advertisement channel previously scanned by the first radio transceiver during the first period and the second radio transceiver during the second period.

In yet another variation of this embodiment, the instructions, when executed, further cause the machine to: generate, by each of the plurality of radio transceivers, an updated beacon data packet including (i) the beacon information captured during the first period or the second period and (ii) a channel flag indicating which advertisement channel of the plurality of advertisement channels the each of the plurality of radio transceivers was scanning when the each of the plurality of radio transceivers captured the beacon information; and adjust (i) an antenna gain profile for at least one radio transceiver of the plurality of radio transceivers or (ii) a gain profile of the beacon data packet based on the updated beacon data packet.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
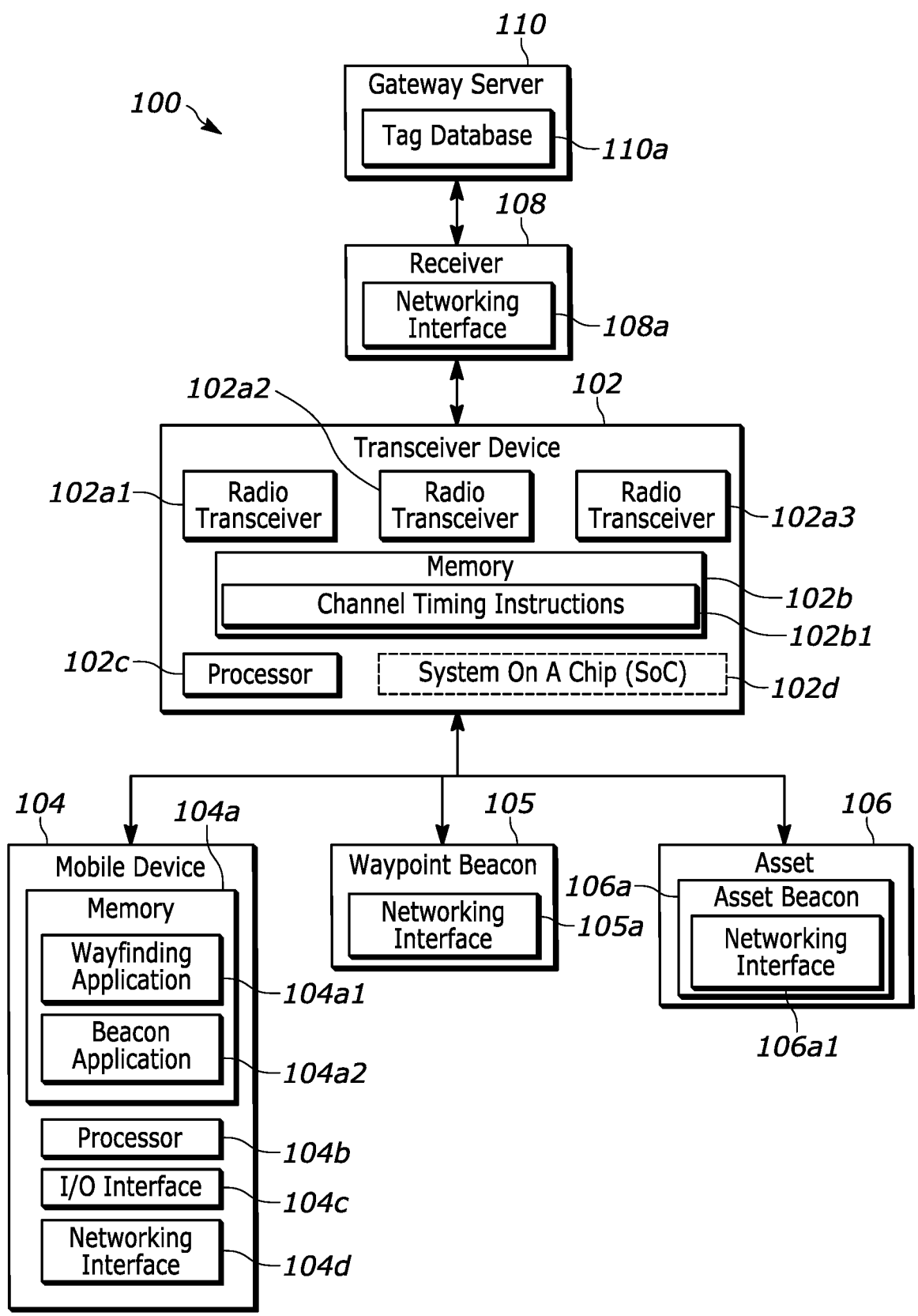
FIG. 1 depicts an example environment in which systems and methods for synchronizing transceiver devices to simultaneously capture data across multiple advertisement channels may be implemented, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, conventional locationing systems suffer from a general lack of flexibility and robustness, such that users typically do not receive accurate, reliable locationing functionalities and from a conventional locationing system. Many of these issues are the result of such conventional locationing devices/systems being unable to reliably detect advertisement packets (also referenced herein as "beacon data packets") from beacon devices. Beacon devices typically transmit data across a rotation of multiple advertisement channels during an advertisement period of relatively short duration. Receiving these advertisement signals thus requires the receiving device to be scanning on the same advertisement channel across which the advertisement was transmitted at the moment the advertisement signal reaches the receiving device. However, conventional receiving devices may similarly rotate between/among the advertisement channels while scanning for advertisement packet transmissions. The relatively short duration of advertisement periods, rotation between/among multiple advertisement channels for both advertising and receiving devices, and the strict timing/channel requirements for the receiver device to receive the advertisement packet creates a significant challenge for conventional locationing devices/systems. In fact, these challenges cause conventional locationing systems to struggle merely receiving advertisement packets, much less, performing efficient, reliable locationing with the few advertisement packets that are actually received.

For example, devices operating in compliance with the Bluetooth® Low Energy (BLE) standard transmit data (e.g., via advertisement and scanning) across three advertisement channels: 37, 38, and 39, which may be approximately 2402 megahertz (MHz), 2426 MHz, and 2480 MHz, respectively. Thus, a beacon transmitting an advertisement packet may sequentially transmit the advertisement packet across each of the three advertisement channels. In an attempt to receive the transmitted advertisement packets, a receiver may sequentially rotate through the same three advertisement channels, but there is no guarantee that the receiver will be scanning on the same channel a particular advertisement packet was transmitted at the moment the advertisement packet reaches the receiver. Consequently, receiver devices included as part of conventional BLE locationing systems suffer from the same timing issues described above.

Overall, this lack of synchronization and timing flexibility causes conventional locationing systems and devices to provide inefficient and underwhelming performance as a result of minimized data capture robustness, reduce the efficiency and general timeliness of information delivery between devices, and create an unsavory user experience.

Thus, it is an objective of the present disclosure to eliminate these and other problems with conventional locationing systems and devices via a transceiver device that may simultaneously capture data across multiple advertisement channels. In particular, the transceiver device of the present disclosure alleviates the issues present with conventional systems/devices by synchronizing multiple radio transceivers to simultaneously scan across multiple advertisement channels in a rotating manner, such that at least one of the multiple radio transceivers are scanning to each of the multiple advertisement channels at any given time during a scan period. The transceiver device of the present disclosure may therefore provide enhanced data capture robustness as compared to conventional locationing systems at least by eliminating the loss of advertisement packets stemming from receiving devices not scanning on the correct advertisement channel at the moment of receipt.

In accordance with the above, and with the disclosure herein, the present disclosure includes improvements in computer functionality or in improvements to other technologies at least because the present disclosure describes that, e.g., locationing systems, and their related various components, may be improved or enhanced with the disclosed transceiver devices and methods that provide more robust and efficient locationing services for respective users and network administrators. That is, the present disclosure describes improvements in the functioning of a transceiver device itself or "any other technology or technical field" (e.g., the field of distributed/industrial locationing systems) because the disclosed transceiver devices and methods improve and enhance operation of transceiver devices by introducing improved data transmission across multiple advertisement channels to eliminate data loss and other inefficiencies typically experienced over time by locationing systems lacking such transceiver devices and methods. This improves the state of the art at least because such previous locationing systems are inefficient and inaccurate, as they lack the ability for robust data transmission across multiple advertisement channels.

In addition, the present disclosure includes applying various features and functionality, as described herein, with, or by use of, a particular machine, e.g., a transceiver device, a plurality of radio transceivers, a mobile device, an asset beacon, a receiver device, and/or other hardware components as described herein.

Moreover, the present disclosure includes specific features other than what is well-understood, routine, conventional activity in the field, or adding unconventional steps that demonstrate, in various embodiments, particular useful applications, e.g., cause the plurality of radio transceivers to scan over each of a plurality of advertisement channels during a first period of a scan period such that each of the plurality of radio transceivers scans over one of the plurality of advertisement channels that is different from other advertisement channels scanned by other radio transceivers during the first period, and during a second period of the scan period, cause the plurality of radio transceivers to scan over each of the plurality of advertisement channels such that each of the plurality of radio transceivers scans over a second one of the plurality of advertisement channels that is different from other advertisement channels scanned by other radio transceivers during the second period.

Turning to the figures, FIG. 1 depicts an example environment 100 in which systems and methods for synchronizing transceiver devices to simultaneously capture data across multiple advertisement channels may be implemented, in accordance with embodiments described herein. The example environment 100 may comprise, include, and/or otherwise be a part of a networking environment in which the systems/devices of the present disclosure may operate. In the example embodiment of FIG. 1, the example environment 100 includes a transceiver device 102 that is communicatively coupled to a mobile device 104, a waypoint beacon 105, an asset beacon 106a disposed within and/or otherwise associated with an asset 106, a receiver 108 (also referenced herein as a "receiver device"), and a gateway server 110. Generally speaking, the transceiver device 102, the mobile device 104, the waypoint beacon 105, the asset beacon 106a, the receiver 108, and/or the gateway server 110 may be capable of executing instructions to, for example, implement operations of the example methods described herein, as may be represented by the flowcharts of the drawings that accompany this description. Namely, the transceiver device 102 may be connected to the mobile device 104, the waypoint beacon 105, the asset beacon 106a, the receiver 108, and/or the gateway server 110 across multiple communication channels, and may generally be configured to receive and process information received from the mobile device 104, the waypoint beacon 105, the asset beacon 106a, the receiver 108, and/or the gateway server 110.

Generally speaking, the transceiver device 102 may be configured to transmit and receive data corresponding to the transceiver device 102 as well as data associated with nearby beacons (e.g., asset beacon 106a, waypoint beacon 105) of various types. As an example, the transceiver device 102 may scan for a proximate waypoint beacon (e.g., waypoint beacon 105), and may transmit the data received from the waypoint beacon to a receiver device (e.g., receiver 108). As another example, the transceiver device 102 may operate as a fixed scanning device that scans for assets (e.g., asset 106) and/or other entities (e.g., human carrying mobile device 104) within range of the device 102, and the device 102 may transmit beacon information associated with the proximate beacons to a receiver device (e.g., receiver 108).

Figure 2:
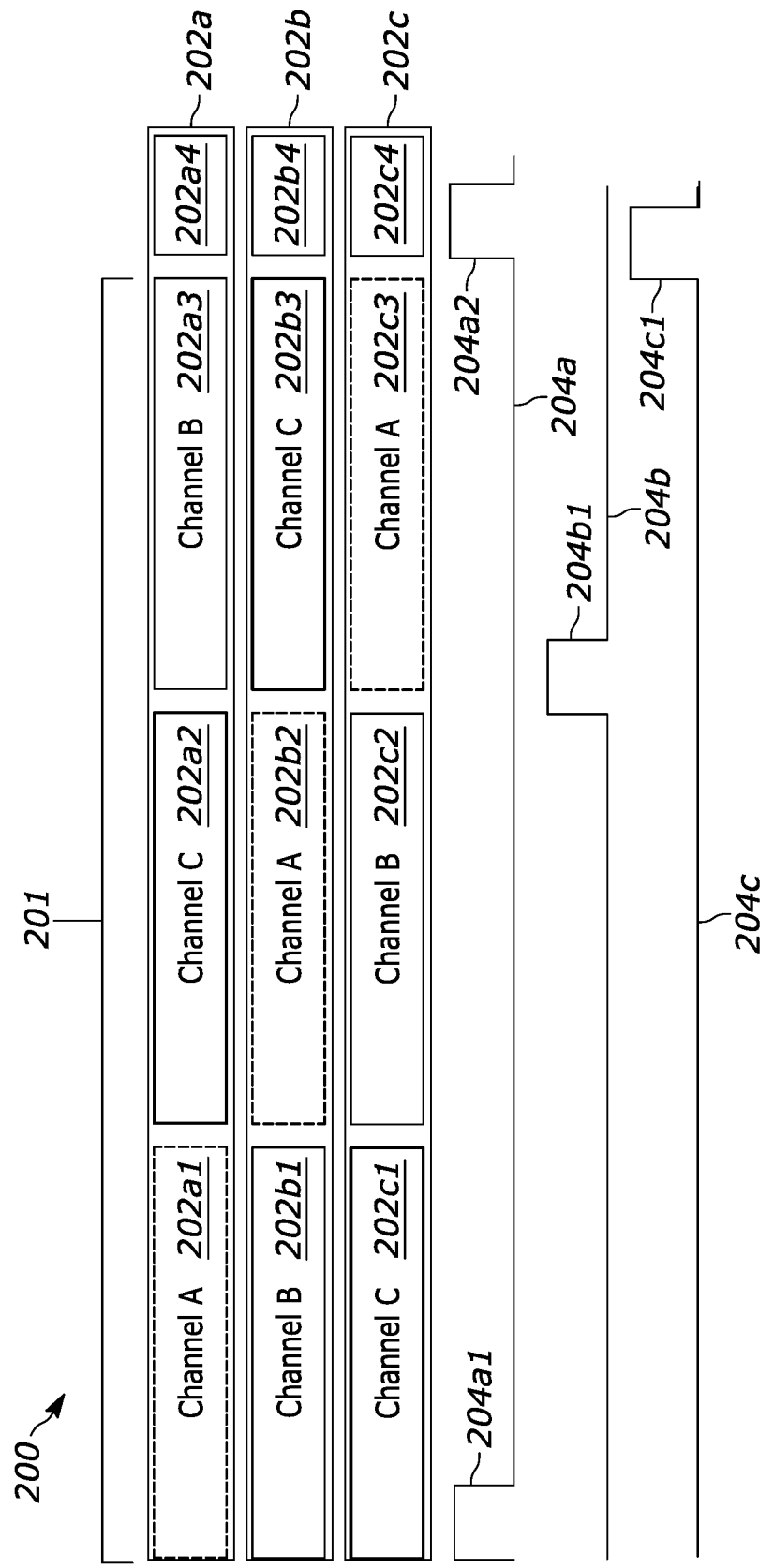
FIG. 2 depicts a high-level timing diagram for synchronizing transceiver devices to simultaneously capture data across multiple advertisement channels, in accordance with embodiments described herein.

More specifically, and as discussed herein in reference to FIG. 2, the transceiver device 102 may be configured to periodically scan for nearby beacons (e.g., asset beacon 106a, mobile device 104 acting as a beacon) by synchronizing the three included radio transceivers 102a1-a3 to simultaneously scan and capture data across each of the applicable advertisement channels. In certain embodiments, the transceiver device 102 may be a Bluetooth® Low Energy (BLE) device that communicates with some/all of the devices in the environment 100 via BLE. Thus, in these embodiments, the transceiver device 102 may synchronize the three radio transceivers to 102a1-a3 simultaneously scan and capture data across each of advertisement channels 37, 38, and 39, as allocated for BLE devices. As a result of this synchronized and simultaneous scanning, the transceiver device 102 may be a key enabler for easily deployable, highly accurate, and reliable radio frequency identification (RFID) location solutions.

The transceiver device 102 may also include multiple radio transceivers 102a1, 102a2, and 102a3 configured to transmit/receive data streams to/from various devices of the example environment 100. The radio transceivers 102a1-a3 may each include an antenna with an associated gain profile corresponding to the respective transceiver's 102a1-a3 antenna converting input power into radio waves (e.g., transmission) and/or received radio waves into electrical power (e.g., receiving). In certain embodiments, the radio transceivers 102a1-a3 may receive beacon data packets from proximate beacons at a particular antenna gain profile, which may be adjusted based on the beacon data packet, such that the radio transceivers 102a1-a3 may optimally receive the beacon data packets during future scan periods.

The transceiver device 102 may also include channel timing instructions 102b1 in the memory 102b that details the specific channel synchronization and rotation timing sequences for each of the radio transceivers 102a1-a3. More specifically, the channel timing instructions 102b1 may include and/or otherwise specify the synchronization of the three radio transceivers 102*a*1-*a*3 based on a scan period, during which the radio transceivers 102*a*1-*a*3 will scan for advertisement packets. The channel timing instructions 102*b*1 may define which radio transceivers 102*a*1-*a*3 will scan on specific advertisement channels at the beginning of the scan period, and may also define an order of how the radio transceivers 102*a*1-*a*3 may rotate scanning to/from each of the specific advertisement channels during the scan period. Specific configurations and implementations of these channel timing instructions 102*b*1 are discussed herein in reference to FIG. 2.

The transceiver device 102 may optionally include a system on a chip (SoC) 102*d*. The SoC 102*d* may include one or more radio transceivers (not shown) and/or a controller to independently receive/transmit and interpret communications without requiring instruction execution from the processor 102*c* and/or reception/transmission of communications through the radio transceiver 102*a*. Such an SoC 102*d* may utilize a dedicated advertisement channel over which communications/signals are sent/received and/or the SoC 102*d* may utilize a rotating set of advertisement channels. Moreover, the SoC 102*d* may include one or more SoCs, such that, in certain embodiments, the transceiver device 102 may receive/transmit and interpret communications/signals through multiple independent SoCs using dedicated or rotating advertisement channels.

The mobile device 104 may be any suitable device that a user may use, for example, to execute a way-finding application 104*a*1 and/or otherwise function as a beacon transmitting beacon data packets for receipt at the transceiver device 102. In particular, the mobile device 104 may be or include a mobile phone (e.g., a smartphone), a laptop, a tablet, a smartwatch, smart glasses, and/or any other suitable computing device or combinations thereof that is capable of communicating with the transceiver device 102. The mobile device 104 includes a memory 104*a*, one or more processors 104*b*, an input/output (I/O) interface 104*c*, and a networking interface 104*d*. The memory 104*a* includes a way-finding application 104*a*1, which may generally include executable instructions, that when executed by the one or more processors 104*b*, cause the mobile device 104 to perform various actions that enable a user of the mobile device 104 to receive location information as a result of data obtained from the transceiver device 102 corresponding to a current location of the user while the user is within range of the transceiver device 102. The memory 104*a* also includes a beacon application 104*a*2, which may generally include executable instructions, that when executed by the one or more processors 104*b*, cause the mobile device 104 to perform various actions that enable a user of the mobile device 104 to transmit location information and/or other information corresponding to the mobile device 104 while the user is within range of the transceiver device 102.

The memory 104*a* may also store an operating system (OS) (e.g., Microsoft Windows, Linux, Unix, etc.) capable of facilitating the functionalities, apps, methods, or other software as discussed herein. Additionally, or alternatively, the way-finding application 104*a*1 and/or the beacon application 104*a*2 may also be stored in an external database (e.g., gateway server 110), which is accessible or otherwise communicatively coupled to the mobile device 104. For example, at least some of the applications, software components, or application programming interfaces (APIs) may be, include, otherwise be part of, a particular application, such as the way-finding application 104*a*1 and/or the beacon application 104*a*2, where each may be configured to facilitate their various functionalities discussed herein. It should be appreciated that one or more other applications may be envisioned that are executed by the one or more processors 104*b*.

The I/O interface 104*c* may include or implement operator interfaces configured to present information to an administrator, user, or operator and/or receive inputs from the administrator, user, or operator. An operator interface may provide a display screen (e.g., via the mobile device 104) which a user/operator may use to visualize any images, graphics, text, data, features, pixels, and/or other suitable visualizations or information. For example, the mobile device 104 may comprise, implement, have access to, render, or otherwise expose, at least in part, a graphical user interface (GUI) for displaying images, graphics, text, data, features, pixels, and/or other suitable visualizations or information on the display screen. The I/O interface 104*c* may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the mobile device 104. According to some embodiments, an administrator or user/operator may access the mobile device 104 to initiate way-finding through the way-finding application 104*a*1, review location information from the way-finding application 104*a*1, transmit location information via the beacon application 104*a*2, make changes, input responses and/or selections, and/or perform other functions.

The waypoint beacon 105 may generally be a fixed beacon that is configured to define a geographical location by transmitting information corresponding to the beacon 105 to proximate beacons and/or other devices. This transmitted information may include, for example, an identification tag corresponding to the beacon 105, and a proximate device (e.g. mobile device 104) may utilize this identification tag to retrieve location information from a server and/or other database (e.g., gateway server 110) that may include a location associated with the identification tag of the beacon 105.

The asset 106 may generally be any device, component, or object that an entity may desire to track and/or otherwise locate. For example, the asset may be large and calibrated tools used in and/or for oil and gas equipment/operations, parcels for delivery by a shipping company, hospital equipment that is and/or may be moved to different floors/rooms, and the like. The asset 106 may also include an asset beacon 106*a* that may be configured to transmit information associated with the asset beacon 106*a* via the networking interface 106*a*1 to, for example, the transceiver device 102.

The receiver 108 may generally be a device configured to receive data from beacon devices (e.g., transceiver device 102) and/or assets (e.g., asset 106) and to transfer this data to an external/gateway server (e.g., gateway server 110). For example, the receiver 108 may be a device that executes and/or conforms to any suitable software operating system (e.g., Android, iOS), a custom Internet of Things (IoT) bridge device with a BLE radio, and/or any other suitable device or combination thereof. The receiver 108 may also have a networking interface 108*a* which may enable the receiver 108 to communicate with the transceiver device 102 and the gateway server 110 using any suitable communication protocol (e.g., Wi-Fi, LTE, 3G, etc.).

As previously mentioned, the gateway server 110 may generally include a tag database 110*a* of associations between beacon identification tags and locations, such that when the receiver 108 forwards an identification tag to the server 110, the server 110 may store/associate a location for the asset associated with the identification tag based on the device from which the identification tag is received (e.g., transceiver device 102). For example, the transceiver device 102 may transmit a captured asset beacon identification tag and/or a captured mobile device beacon identification tag to the receiver 108, which may forward the tag(s) to the gateway server 110. The gateway server 110 may query the tag database 110a to find an entry corresponding to the captured asset beacon identification tag and/or the captured mobile device beacon identification tag. When the server 110 locates a matching entry, the server 110 may store/update the location stored in the entry to reflect the captured asset's/user's proximity to the transceiver device 102 and/or forward the location to an appropriate connected device to facilitate tracking the captured asset/user.

As an example, a workstation (not shown) may be communicatively connected to the gateway server 110, and a user/operator may access the gateway server 110 to retrieve a location associated with a captured asset (e.g., mobile device 104, asset 106). The workstation may query the gateway server 110 with the identification tag of the corresponding captured asset, and the gateway server 110 may match the identification tag with a location entry associated with a proximate beacon (e.g., transceiver device 102). The gateway server 110 may then forward the location entry to the workstation for viewing by the user/operator.

As another example, devices using the transceiver device 102 for way-finding functionality may query the gateway server 110 directly (or through the receiver 108) to retrieve the location corresponding to the transceiver device 102. In particular, the mobile device 104 may receive a waypoint beacon stream (WBS) from the transceiver device 102, and as a result, may receive an identification tag (e.g., a MAC ID) of the transceiver device 102. The mobile device 104 may then directly/indirectly query the gateway server 110 by, in part, transmitting the identification tag of the transceiver device 102 to the server 110. The gateway server 110 may retrieve a location associated with the identification tag of the transceiver device 102, and may forward the location to the mobile device 104 for use in the wayfinding application 104a1.

More generally, each of the one or more memories 102b, 104a may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., way-finding application 104a1, beacon application 104a2, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 102c, 104b (e.g., working in connection with a respective operating system in the one or more memories 102b, 104a) to facilitate, implement, or perform the machine readable instructions, methods, processes, elements or limitations, as illustrated, depicted, or described for the various flowcharts, illustrations, diagrams, figures, and/or other disclosure herein.

In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.). Moreover, the one or more memories 102b, 104a may also store machine readable instructions, including any of one or more application(s), one or more software component(s), and/or one or more APIs, which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

The one or more processors 102c, 104b may be connected to the one or more memories 102b, 104a via a computer bus responsible for transmitting electronic data, data packets, or otherwise electronic signals to and from the one or more processors 102c, 104b and one or more memories 102b, 104a to implement or perform the machine readable instructions, methods, processes, elements or limitations, as illustrated, depicted, or described for the various flowcharts, illustrations, diagrams, figures, and/or other disclosure herein.

The one or more processors 102c, 104b may interface with the one or more memories 102b, 104a via the computer bus to execute any suitable application (e.g., way-finding application 104a1, beacon application 104a2) or executable instructions necessary to perform any of the actions associated with the methods of the present disclosure. The one or more processors 102c, 104b may also interface with the one or more memories 102b, 104a via the computer bus to create, read, update, delete, or otherwise access or interact with the data stored in the one or more memories 102b, 104a and/or external databases (e.g., a relational database, such as Oracle, DB2, MySQL, or a NoSQL based database, such as MongoDB). The data stored in the one or more memories 102b, 104a and/or an external database may include all or part of any of the data or information described herein, including, for example, captured beacon information/data, MAC identifier(s), heartbeat data, and/or other suitable information or combinations thereof from any suitable stream or source.

The radio transceivers 102a1-a3 and the networking interfaces 104d, 105a, 106a1, 108a may be configured to communicate (e.g., send and receive) data via one or more external/network port(s) to one or more networks or local terminals, as described herein. In some embodiments, the radio transceivers 102a1-a3 and/or the networking interfaces 104d, 105a, 106a1, 108a may include a client-server platform technology such as ASP.NET, Java J2EE, Ruby on Rails, Node.js, a web service or online API, responsive for receiving and responding to electronic requests. The radio transceivers 102a1-a3 and/or the networking interfaces 104d, 105a, 106a1, 108a may implement the client-server platform technology that may interact, via the computer bus, with the one or more memories 102b, 104a (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the radio transceivers 102a1-a3 and the networking interfaces 104d, 105a, 106a1, 108a may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a network. In some embodiments, the network (not shown) may comprise a private network or local area network (LAN). Additionally, or alternatively, the network may comprise a public network such as the Internet. In some embodiments, the network may comprise routers, wireless switches, or other such wireless connection points communicating to transceiver device 102 (via the radio transceivers 102a1-a3), the mobile device 104 (via networking interface 104d), the waypoint beacon 105 (via networking interface 105a), the asset beacon 106a (via networking interface 106a1), and the receiver 108 (via networking interface 108a) via wireless communications based on any one or more of various wireless standards, including by non-limiting example, a BLUETOOTH standard (e.g., BLE), IEEE 802.11a/b/c/g (WIFI), or the like.

FIG. 2 depicts a high-level timing diagram 200 for synchronizing transceiver devices (e.g., the radio transceivers 102a1-a3) to simultaneously capture data across multiple advertisement channels, in accordance with embodiments described herein. Broadly speaking, and as previously mentioned, the radio transceivers 102a1-a3 may scan for proximate devices during a scan period. This scan period may generally be part of a larger cycle period, where the radio transceivers 102a1-a3 may both scan for advertisement packets and subsequently broadcast the advertisement packets. When the scan period for the radio transceivers 102a1-a3 is concluded, the radio transceivers 102a1-a3 may, for example, enter a transmission period where the radio transceivers 102a1-a3 may transmit the advertisement packets using a suitable advertisement stream. Thus, the cycle period may generally consist of the scan period and the transmission period, and the scan period may only account for a small percentage of the time defining the cycle period. For example, if the cycle period for radio transceivers 102a1-a3 is five minutes in length, then the scan period may be approximately five seconds, and the transmission period may account for the remaining four minutes and fifty-five seconds of the cycle period.

A reason for this time differential between the scan period and the transmission period is that scanning for proximate beacons is power consuming, such that minimizing the scan period is an important consideration to lengthen the battery life of the transceiver device. Determining a time period of the scan period is also influenced by the chirp time of any proximate devices the transceiver device may hear. Typically, asset beacons (e.g., asset beacon 106a), waypoint beacons (e.g., waypoint beacon 105), and other devices functioning as a beacon (e.g., mobile device 104 executing the beacon application 104a2) may have a standard chirp time, during which, the beacons output an advertisement packet across three advertisement channels. The chirp time may generally be the time between a beacon transmission on a single advertisement channel (e.g., 37, 38, 39) and the next beacon transmission on that same channel. The chirp may be the transmission period, during which, the beacon outputs the advertisement packet; and the chirp may include sending an advertisement packet on any suitable number of advertisement channels (e.g., one, two, or three advertisement channels).

More specifically, beacons may sleep for the majority of their chirp time, and may only transmit advertisement packets during a small portion of the chirp time. As an example, if a chirp time of a beacon is two seconds, then the sleep time of that beacon may last 1.995 seconds, and the beacon may output an advertisement packet across three advertisement channels for the remaining approximately five milliseconds (e.g., a transmission period). The three advertisement channels may generally be radio frequency channels, and may include channels 37, 38, and 39, which may be approximately 2402 megahertz (MHz), 2426 MHz, and 2480 MHz, respectively. Further, to avoid collisions between/among transmitted signals on identical advertisement channels and having multiple beacons advertising in synchronization, each beacon device may dither its respective chirp times randomly in addition to changing the order of the advertisement channels on which the packets are transmitted.

With this example chirp time in mind, the scan period for conventional receivers may be approximately 2 seconds in an attempt to ensure that each proximate beacon may transmit an advertisement packet for receipt by the conventional receivers during the scan period, and that the conventional receivers may have an opportunity to receive the packet. However, even such an appropriately timed scan period may result in the conventional receivers missing transmissions from proximate beacons due to several other factors. For example, conventional receivers generally rotate through the three advertisement channels during the scan period to attempt to receive transmissions on each of the channels during each cycle period, such that the scan period is divided among each of the channels. Additionally, channel interference may cause transmissions on a particular advertisement channel to fail to reach the conventional receivers during the scan period or to be uninterpretable by the conventional receivers upon receipt. In all, these multiple considerations may cause a conventional receiver to miss transmissions from proximate beacons, and may leave a user to balance battery life considerations against successful advertisement packet receipts.

To resolve these issues with conventional receivers and advertisement channel rotations, the high-level timing diagram 200 details how the channel timing instructions 102b1 may configure the radio transceivers 102a1-a3 to rotate through three advertisement channels (e.g., channel A, channel B, channel C) in a manner that achieves synchronized and simultaneous scanning on each of the three advertisement channels during a scan period 201. In particular, in embodiments where the radio transceivers 102a1-a3 are BLE transceivers, the three advertisement channels may be channel 37, channel 38, and channel 39. Specifically, channel A may be channel 37, channel B may be channel 38, and channel C may be channel 39. Thus, as a result of the scanning sequencing represented by the high-level timing diagram 200, devices implementing the systems and methods of the present disclosure may dramatically increase advertisement packet intake while remaining BLE compliant.

In any event, the high-level timing diagram 200 represents a scan period 201 of three radio transceivers (e.g., the radio transceivers 102a1-a3) that rotate through three advertisement channels: A, B, and C. The particular channel rotation and sequencing for a first radio transceiver is represented in the first sequencing block 202a. The particular channel rotation and sequencing for a second radio transceiver is represented in the second sequencing block 202b. The particular channel rotation and sequencing for a third radio transceiver is represented in the third sequencing block 202c. Each sequencing block 202a-c is further subdivided into three sub-periods 202a1-a3, 202b1-b3, and 202c1-c3 that are part of the scan period 201 and a fourth sub-period 202a4, 202b4, and 202c4 that represents the beginning of a subsequent scan period. The scan period 201 may be any suitable length of time, such as 500 milliseconds (ms), such that each sub-period 202a1-a3, 202b1-b3, and 202c1-c3 within the scan period 201 may be one-third of 500 ms.

Moreover, the high-level timing diagram 200 also includes a set of signal lines 204a, 204b, 204c that represent signals generated by the corresponding radio transceivers. Namely, the first signal line 204a represents signals generated by the first radio transceiver represented by the first sequencing block 202a, the second signal line 204b represents signals generated by the second radio transceiver represented by the second sequencing block 202b, and the third signal line 204c represents signals generated by the third radio transceiver represented by the third sequencing block 202c.

As illustrated in FIG. 2, the radio transceivers (e.g., radio transceivers 102a1-a3) may begin scanning (i.e., scanning) synchronously across the advertisement channel. At the first sub-periods 202a1, 202b1, and 202c1, the first radio transceiver may scan across channel A, the second radio transceiver may scan across channel B, and the third radio transceiver may scan across channel C. Also, upon initiation of the first sub-periods 202a1, 202b1, and 202c1, the first radio transceiver may generate a synchronization pulse 204a1 that may cause the second and third radio transceivers to initiate timers set to expire at specific times during the scan period 201. In certain embodiments, the first radio transceiver may generate the synchronization pulse 204a1 by driving a general purpose input/output (GPIO) pin signal to a low output. For example, the synchronization pulse 204a1 may cause the second radio transceiver to initiate a timer set to expire after one-third of the scan period 201 (e.g., at the beginning of the second sub-period 202b2) has elapsed. As another example, the synchronization pulse 204a1 may cause the third radio transceiver to initiate a timer set to expire after two-thirds of the scan period 201 (e.g., at the beginning of the third sub-period 202c3) has elapsed.

When the timers elapse, each of the radio transceivers may rotate to a new advertisement channel. To illustrate, at the beginning of the second sub-periods 202a2, 202b2, and 202c2, the first radio transceiver may rotate from channel A to scan across channel C, the second radio transceiver may rotate from channel B to scan across channel A, and the third radio transceiver may rotate from channel C to scan across channel B. Further, at the beginning of the third sub-periods 202a3, 202b3, and 202c3, the first radio transceiver may rotate from channel C to scan across channel B, the second radio transceiver may rotate from channel A to scan across channel C, and the third radio transceiver may rotate from channel B to scan across channel A. Thus, the timers set by the second and third radio transceivers may keep the second sub-periods 202a2, 202b2, and 202c2, and the third sub-periods 202a3, 202b3, and 202c3 synchronized by basing the rotations between advertisement channels on the individual timers.

In certain embodiments, the particular order of the channel rotations at each sub-period of the respective sequencing blocks 202a, 202b, and 202c may be programmatically assigned through channel timing instructions (e.g., channel timing instructions 102b1), such that the channel rotation assignments may not be determined in real-time and/or randomly. For example, the assignment of channel A to the first radio transceiver during the first sub-period 202a1, the assignment of channel B to the second radio transceiver during the first sub-period 202b1, and the assignment of channel C to the third radio transceiver during the first sub-period 202c1 may be pre-determined and included as part of the channel timing instructions. Further, the subsequent rotation assignments may also be pre-determined, such that the first radio transceiver rotating from channel A to channel C at the second sub-period 202a2, the second radio transceiver rotating from channel B to channel A at the second sub-period 202b2, and the third radio transceiver rotating from channel C to channel B at the second sub-period 202c2 is also included as part of the channel timing instructions. Additionally, or alternatively, the channel timing instructions may simply include a scanning order corresponding to a single channel (e.g., channel A is sequentially scanned by the first, second, and third radio transceivers), and the rotations involving the other channels may be determined in real-time and/or randomly based on the single channel scanning order.

Moreover, the second and third radio transceivers may generate end period pulses 204b1 and 204c1, that generally represent the second and third radio transceivers ending their respective scanning sub-periods 202b2 and 202c3 on channel A. Namely, the first end period pulse 204b1 corresponds to the second radio transceiver ending the second sub-period 202b2, and thereby rotating from scanning across channel A to scanning across channel C during the third sub-period 202b3. Likewise, the second end period pulse 204c1 corresponds to the third radio transceiver ending the third sub-period 202c3, and thereby rotating from scanning across channel A to scanning across channel C during the fourth sub-period 202c4.

The first radio transceiver may utilize these end period pulses 204b1 and 204c1 to determine when to generate a subsequent synchronization pulse 204a2. Generally, each radio transceiver may not begin and/or end their respective scan sub-periods (e.g., 202b2, 202c3) such that each scanning sup-period perfectly overlaps without any delays. These delays are typically a result of intrinsic delays carried by the respective advertisement channels. For example, the second radio transceiver represented in sequencing block 202b may fail to begin the second sub-period 202b2 scan of channel A immediately following the first sub-period 202b1 scan of channel B due to an intrinsic delay of channel A and/or B, and/or the third radio transceiver represented in sequencing block 202c may similarly fail to begin the third sub-period 202c3 scan of channel A immediately following the second sub-period 202c2 scan of channel B due to the intrinsic delay of channel A and/or B. Thus, to account for these potential delays and maintain synchronization of all three radio transceivers, the first radio transceiver may receive the end period pulses 204b1 and 204c1, analyze the timing information contained therein, and may determine when to generate the subsequent synchronization pulse 204a2 to avoid subsequently mistimed and/or otherwise delayed execution of the channel rotations specified in the channel timing instructions. In certain embodiments, these end period pulses 204b1 and 204c1 may correspond to the second radio transceiver and the third radio transceiver driving a GPIO line of the first radio transceiver high when the first, second, and third radio transceivers complete scanning across each of the three channels (e.g., successfully scan through the first, second, and third sub-periods 202a1-a3, 202b1-b3, and 202c1-c3).

In certain embodiments, at least one of the radio transceivers may transmit to a receiver device (e.g., receiver device 108) an updated beacon data packet that includes (i) beacon information (e.g., the beacon data packet) captured during the one of the sub-periods 202a1-a3, 202b1-b3, and 202c1-c3 or, more generally, the scan period 201; and (ii) a channel flag indicating which advertisement channel the radio transceiver(s) were scanning when the radio transceiver(s) captured the beacon information. Further in these embodiments, the receiver device may include a timestamp with the beacon data packet upon receipt to indicate when the receiver device received the beacon data packet from the radio transceiver. Moreover, in some implementations of these embodiments, the radio transceivers may include a time stamp from a radio frequency (RF) portion of the chip comprising the radio transceivers in the updated beacon data packet that indicates when the radio transceiver received the beacon data packet from the proximate beacon device. In any event, the receiver device may receive the updated beacon data packet from the radio transceivers, and the receiver device 108, the gateway server (e.g., gateway server 110), and/or the transceiver device 102 may proceed to adjust (i) an antenna gain profile for at least one radio transceiver and/or (ii) a gain profile of the beacon data packet based on the updated beacon data packet. For example, the receiver device 108 and/or the gateway sever 110 may adjust the received signal strength indicator (RSSI) for each beacon data packet based upon transmit and/or receive antenna gain differences present on the three different advertisement channels, as indicated in the updated beacon data packet.

Regardless, the high-level timing diagram 200 of FIG. 2 illustrates that the transceiver device (e.g., transceiver device 102) may receive beacon data packets on each advertisement channel (e.g., A, B, and C) during each chirp period of any advertising device. Thus, the high-level timing diagram 200 broadly represents a method of radio transceiver synchronization and sequential channel rotation that yields multiple advantages. Namely, the radio transceiver synchronization and sequential channel rotation represented in the high-level timing diagram 200 may significantly increase the battery life of advertising devices, and may dramatically increase the data acquisition rate/amount of the transceiver device 102.

The radio transceiver synchronization and sequential channel rotation enables a user/operator to lengthen advertising device batter life by enabling the operator of the advertising device to lengthen the periodicity of the advertising device chirps. For example, in a conventional locationing system, the advertising device may have a chirp period (e.g., transmitting over each advertisement channel A, B, C) every 500 ms, and during each chirp period, a receiver device may receive the beacon data packet once (e.g., over one of the advertisement channels A, B, C).

However, with the radio transceiver synchronization and sequential channel rotation of the present disclosure, the user/operator may triple the length of the chirp frequency and receive the same amount of data as conventional systems. To illustrate, in the conventional 500 ms chirp period, the receiver device may receive one beacon data packet, such that over three chirp periods (1500 ms) including at least nine beacon data packet transmissions, the receiver device may receive three such beacon data packets. By contrast, with the radio transceiver synchronization and sequential channel rotation of the present disclosure, the receiver device may receive three advertisement packets during each chirp period. In other words, during one 1500 ms chirp period including three beacon data packet transmissions, the receiver device may receive three advertisement packets. Thus, the advertising frequency of the advertising device may be reduced by two-thirds to conserve battery life, while maintaining the same overall amount of data acquisition.

Moreover, the radio transceiver synchronization and sequential channel rotation of the present disclosure may also enable receipt of three times the normal amount of data obtained during each chirp period of an advertising device. This may be particularly useful in situations where high data acquisition rates are paramount, such as identifying exactly where a particular person (e.g., patient) is located based on a beacon device corresponding to the person. More specifically, this increased rate of data acquisition as compared to conventional systems is particularly helpful for mobile beacon devices, where the location of the beacon device may change quickly, such that the increased data acquisition rate of the systems and methods of the present disclosure may be necessary to efficiently and accurately determine the beacon device's location over time.

To illustrate, in conventional systems, receiving one beacon data packet per chirp period and/or scan period may be sufficient to detect where a beacon device is located, but these conventional systems provide consistently underwhelming performance. For example, when a person steps in between and/or an object is disposed between the receiver device (e.g., transceiver device 102) and the beacon device, the conventional system may generally assume that the lack of signal is simply due to the beacon device being out of the receiver device's range. The conventional system may then change the identified location of the beacon device and/or otherwise remove the beacon device from the beacon device's actual location. By contrast, if the transceiver device 102 of the present disclosure receives beacon data packets from a beacon device across each of the advertisement channels, and then suddenly fails receive a beacon data packet across any of the advertisement channels, then the systems of the present disclosure (e.g., transceiver device 102, receiver device 108, and gateway server 110 of FIG. 1) may not automatically assume that the beacon device has changed location. Instead, the systems of the present disclosure may wait a pre-determined period of time for subsequent beacon data packet transmissions before updating and/or otherwise changing the location of the beacon device.

Additionally, this increased data acquisition rate as compared to conventional systems may help when performing signal analysis to more acutely determine the location of the beacon device. As mentioned, each of the advertisement channels may have distinct characteristics, such as a gain profile. These distinct characteristics, and in particular the gain profiles of the respective advertisement channels, may enable the systems of the present disclosure to achieve a higher degree of accuracy when determining locations of beacon devices. For example, assume that the transceiver device 102 receives a first beacon data packet across a first channel (e.g., channel 37) with a first received strength, the transceiver device 102 receives a second beacon data packet across a second channel (e.g., channel 38) with a second received strength, and the transceiver device 102 receives a third advertising signal across a third channel (e.g., channel 39) with a third received strength. In this example, the transceiver device 102, gateway server 110, and/or other suitable device or combinations thereof may analyze the three received strengths and determine that the beacon device transmitting the three beacon data packets is in a particular location, as determined based on triangulation and/or other suitable methods accounting for the different received strengths of the beacon data packets across the three different advertisement channels.

Figure 3:
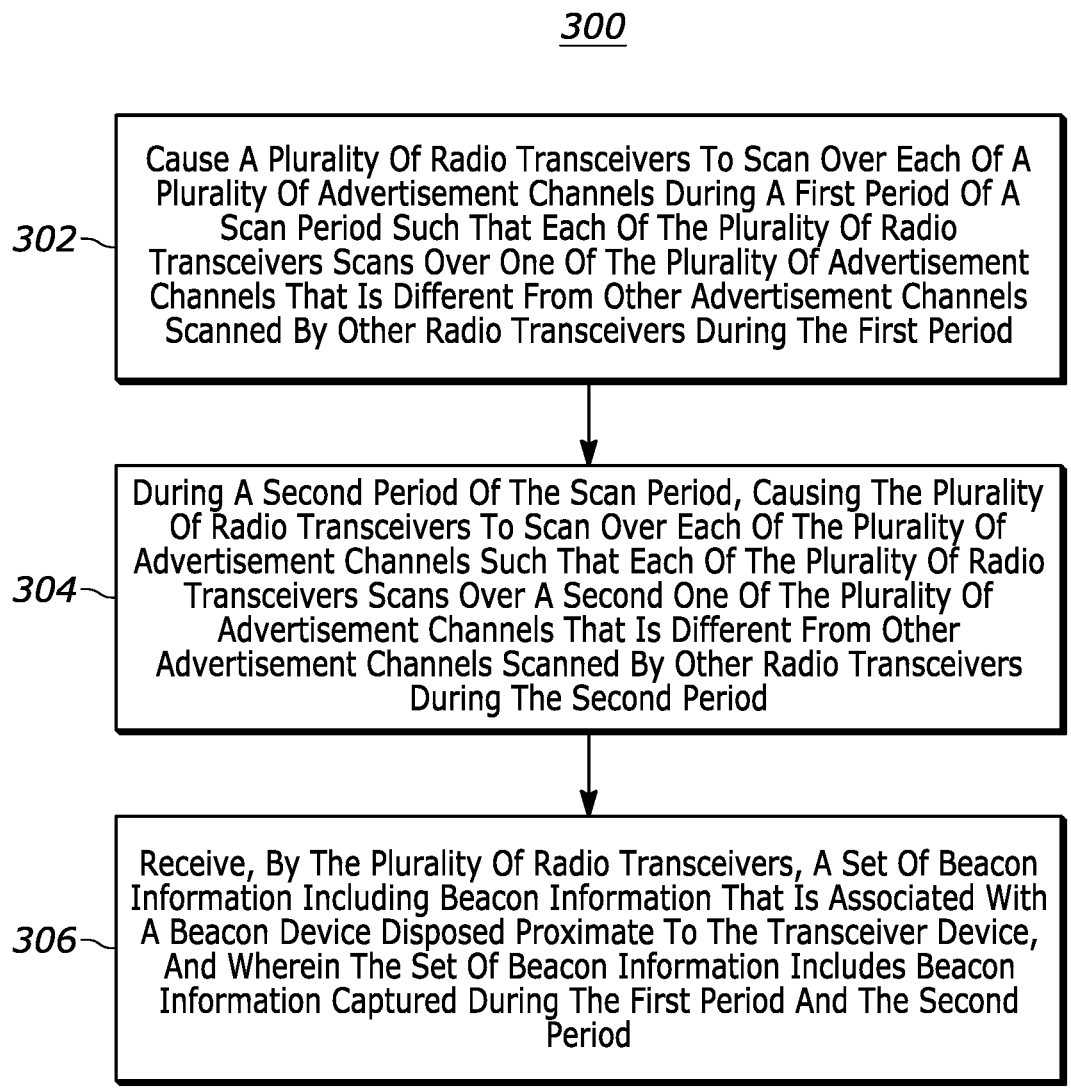
FIG. 3 is a flowchart representative of a method for synchronizing transceiver devices to simultaneously capture data across multiple advertisement channels, in accordance with embodiments described herein.

FIG. 3 is a flowchart representative of a method 300 for synchronizing transceiver devices (e.g., radio transceivers 102a1-a3 within transceiver device 102) to simultaneously capture data across multiple advertisement channels, in accordance with embodiments described herein. Generally, and as described herein, the method 300 may include a plurality of radio transceivers scanning over a plurality of advertisement channels during a scan period, and receiving a beacon data packet associated with a proximate beacon device during multiple sub-periods of the scan period. It is to be understood that any of the steps of the method 300 may be performed by, for example, the transceiver device 102, and/or any other suitable components or combinations thereof discussed herein.

At block 302, the method 300 includes causing a plurality of radio transceivers to scan over each of a plurality of advertisement channels during a first period of a scan period, such that each of the plurality of radio transceivers scans over one of the plurality of advertisement channels that is different from other advertisement channels scanned by other radio transceivers during the first period. At block 304, the method 300 includes, during a second period of the scan period, causing the plurality of radio transceivers to scan over each of the plurality of advertisement channels, such that each of the plurality of radio transceivers scans over a second one of the plurality of advertisement channels that is different from other advertisement channels scanned by other radio transceivers during the second period. At block 306, the method 300 includes receiving, by the plurality of radio transceivers, a beacon data packet including beacon information that is associated with a beacon device disposed proximate to the transceiver device. The beacon data packet may include beacon information captured during the first period and the second period.

In certain embodiments, the method 300 may further comprise: during a third period of the scan period, causing the plurality of radio transceivers to scan over each of the plurality of advertisement channels such that each of the plurality of radio transceivers scans over a third one of the plurality of advertisement channels that is different from other advertisement channels scanned by other radio transceivers during the third period; and receiving, by the plurality of radio transceivers, the beacon data packet including beacon information that is associated with the beacon device disposed proximate to the transceiver device. In these embodiments, the beacon data packet may include beacon information captured during the first period, the second period, and the third period. Further in these embodiments, the plurality of radio transceivers may include a first BLE radio transceiver, a second BLE transceiver, and a third BLE transceiver; and the plurality of advertisement channels may include a first BLE advertisement channel, a second BLE advertisement channel, and a third BLE advertisement channel.

In some embodiments the method 300 may further comprise: generating, by a first radio transceiver at a beginning of the first period, a synchronization pulse (e.g., synchronization pulse 204a1) that is transmitted to other radio transceivers of the plurality of radio transceivers; and upon receipt of the synchronization pulse at a second radio transceiver, activating a timer configured to expire at a beginning of the second period. Further in these embodiments, the scan period may include a third period, the plurality of radio transceivers may include a third radio transceiver, and the method 300 may further comprise: upon receipt of the synchronization pulse at the third radio transceiver, activating a second timer configured to expire at a beginning of the third period; at the beginning of the second period and synchronous with the timer expiring, scanning, by the second radio transceiver, an advertisement channel previously scanned by the first radio transceiver during the first period; and at the beginning of the third period and synchronous with the second timer expiring, scanning, by the third radio transceiver, the advertisement channel previously scanned by the first radio transceiver during the first period and the second radio transceiver during the second period. Still further in these embodiments, the method 300 may further comprise: generating, by the second radio transceiver at an ending of the second period, an ending pulse (e.g., end period pulses 204b1 and 204c1) for transmission to the first radio transceiver; and automatically adjusting, by the first radio transceiver, the beginning of the first period during a subsequent iteration of the scan period based on delays indicated by the ending pulse.

In certain embodiments, the method 300 may further comprise: generating, by each of the plurality of radio transceivers, an updated beacon data packet including (i) the beacon information captured during the first period or the second period and (ii) a channel flag indicating which advertisement channel of the plurality of advertisement channels the each of the plurality of radio transceivers was scanning when the each of the plurality of radio transceivers captured the beacon information; and adjusting (i) an antenna gain profile for at least one radio transceiver of the plurality of radio transceivers or (ii) a gain profile of the beacon data packet based on the updated beacon data packet.

In some embodiments, the scan period may include a third period, the scan period may be 500 milliseconds (ms), and each of the first period, the second period, and the third period may be one-third of 500 ms.

Of course, it is to be appreciated that the actions of the method 300 may be performed in any suitable order and any suitable number of times.

Figure 4:
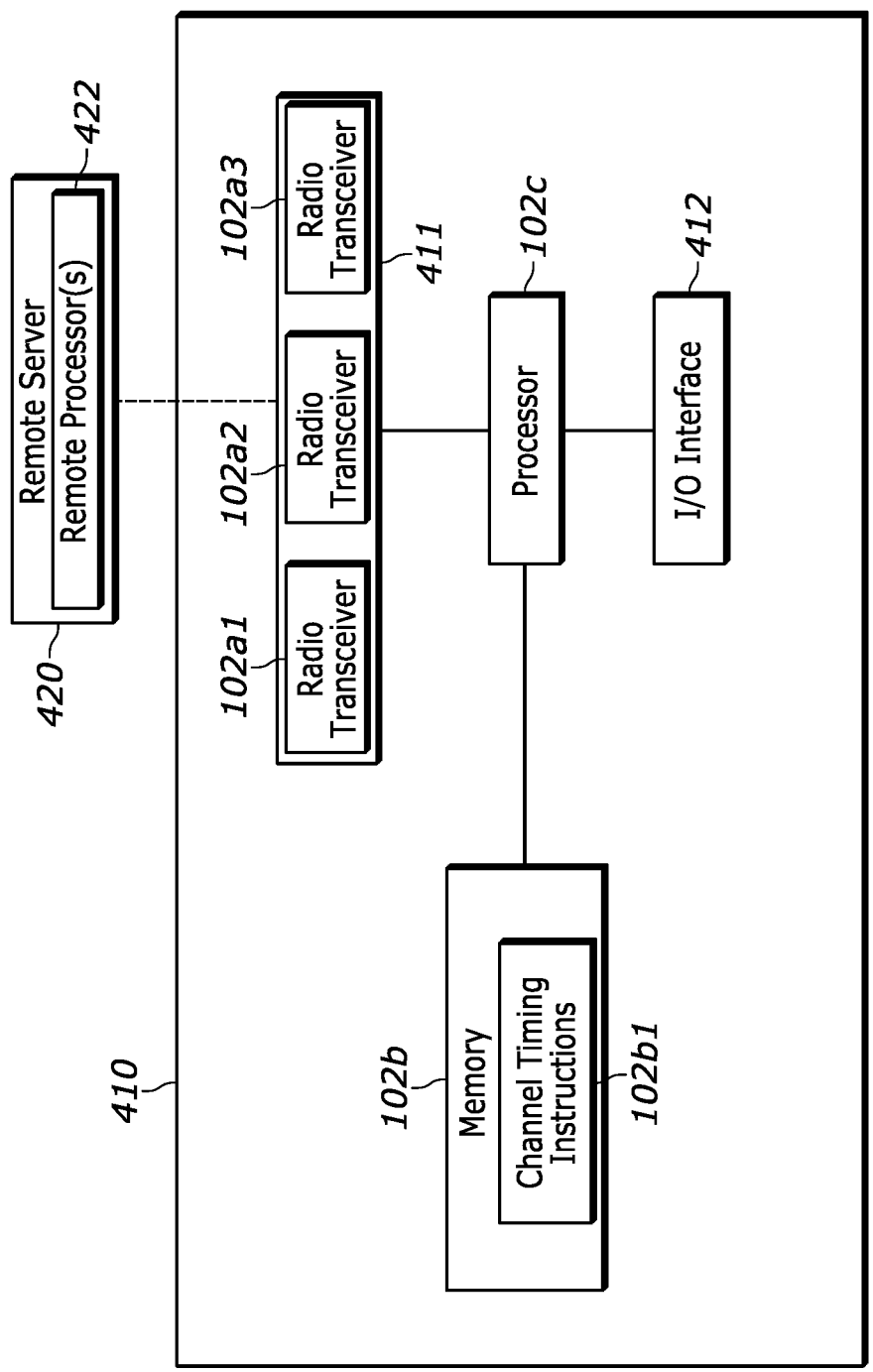
FIG. 4 is a block diagram of an example logic circuit for implementing example methods and/or operations described herein.

FIG. 4 is a block diagram representative of an example logic circuit capable of implementing example methods and/or operations described herein. As an example, the example logic circuit may be capable of implementing one or more components of the transceiver device 102 of FIG. 1. The example logic circuit of FIG. 4 is a processing platform 410 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 410 of FIG. 4 includes a processor 102c such as, for example, one or more microprocessors, controllers, and/or any suitable type of processor. The example processing platform 410 of FIG. 4 includes memory (e.g., volatile memory, non-volatile memory) 102b accessible by the processor 102c (e.g., via a memory controller). The example processor 102c interacts with the memory 102b to obtain, for example, machine-readable instructions stored in the memory 102b corresponding to, for example, the operations represented by the flowcharts of this disclosure. The memory 102b also includes the channel timing instructions 102b1 that are accessible by the example processor 102c. The channel timing instructions 102b1 may comprise rule-based instructions configured to, for example, cause the example processor 102c to initiate the synchronization procedure for the three radio transceivers 102*a*1-*a*3 (e.g., causing the radio transceiver 102*a*1 to generate a synchronization pulse 204*a*1), as previously described. The channel timing instructions 102*b*1 may define which of the radio transceivers 102*a*1-*a*3 will scan on specific advertisement channels at the beginning of the scan period, and may also define an order of how the radio transceivers 102*a*1-*a*3 may rotate scanning to/from each of the specific advertisement channels during the scan period.

More specifically, the example processor 102*c* may access the memory 102*b* to execute, reference, and/or otherwise interpret the channel timing instructions 102*b*1 when initiating a scan period for the radio transceivers 102*a*1-*a*3. Additionally, or alternatively, machine-readable instructions corresponding to the example operations described herein may be stored on one or more removable media (e.g., a compact disc, a digital versatile disc, removable flash memory, etc.) that may be coupled to the processing platform 410 to provide access to the machine-readable instructions stored thereon.

The example processing platform 410 of FIG. 4 also includes a plurality of radio transceivers 102*a*1-*a*3 to enable communication with other machines via, for example, one or more networks. The plurality of radio transceivers 102*a*1-*a*3 may include any suitable type of communication interface(s) (e.g., wired and/or wireless interfaces) configured to operate in accordance with any suitable protocol(s) (e.g., Ethernet for wired communications, and/or BLE or IEEE 802.11 for wireless communications).

The example processing platform 410 of FIG. 4 also includes input/output (I/O) interfaces 412 to enable receipt of user input and communication of output data to the user. Such user input and communication may include, for example, any number of keyboards, mice, USB drives, optical drives, screens, touchscreens, etc.

Further, the example processing platform 410 may be connected to a remote server 420. The remote server 420 may include one or more remote processors 422, and may be configured to execute instructions to, for example, implement operations of the example methods described herein, as may be represented by the flowcharts of the drawings that accompany this description.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application-specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A transceiver device comprising:
at least one processor;
a plurality of radio transceivers; and
a memory storing instructions that, when executed by the at least one processor, cause the transceiver device to:
cause the plurality of radio transceivers to scan over each of a plurality of advertisement channels during a first period of a scan period such that each of the plurality of radio transceivers scans over one of the plurality of advertisement channels that is different from other advertisement channels scanned by other radio transceivers during the first period,
during a second period of the scan period, cause the plurality of radio transceivers to scan over each of the plurality of advertisement channels such that each of the plurality of radio transceivers scans over a second one of the plurality of advertisement channels that is different from other advertisement channels scanned by other radio transceivers during the second period, and
receive, by the plurality of radio transceivers, a beacon data packet including beacon information that is associated with a beacon device disposed proximate to the transceiver device, and wherein the beacon data packet includes beacon information captured during the first period and the second period.

2. The transceiver device of claim 1, wherein the instructions, when executed, further cause the transceiver device to:
during a third period of the scan period, cause the plurality of radio transceivers to scan over each of the plurality of advertisement channels such that each of the plurality of radio transceivers scans over a third one of the plurality of advertisement channels that is different from other advertisement channels scanned by other radio transceivers during the third period, and
receive, by the plurality of radio transceivers, the beacon data packet including beacon information that is associated with the beacon device disposed proximate to the transceiver device, and wherein the beacon data packet includes beacon information captured during the first period, the second period, and the third period.

3. The transceiver device of claim 2, wherein:
the plurality of radio transceivers includes a first Bluetooth Low Energy (BLE) radio transceiver, a second BLE transceiver, and a third BLE transceiver; and
the plurality of advertisement channels includes a first BLE advertisement channel, a second BLE advertisement channel, and a third BLE advertisement channel.

4. The transceiver device of claim 1, wherein the instructions, when executed, further cause the transceiver device to:
generate, by a first radio transceiver at a beginning of the first period, a synchronization pulse that is transmitted to other radio transceivers of the plurality of radio transceivers; and
upon receipt of the synchronization pulse at a second radio transceiver, activate a timer configured to expire at a beginning of the second period.

5. The transceiver device of claim 4, wherein the scan period includes a third period, the plurality of radio transceivers includes a third radio transceiver, and the instructions, when executed, further cause the transceiver device to:
upon receipt of the synchronization pulse at the third radio transceiver, activate a second timer configured to expire at a beginning of the third period;
at the beginning of the second period and synchronous with the timer expiring, the second radio transceiver scans an advertisement channel previously scanned by the first radio transceiver during the first period; and
at the beginning of the third period and synchronous with the second timer expiring, the third radio transceiver scans the advertisement channel previously scanned by the first radio transceiver during the first period and the second radio transceiver during the second period.

6. The transceiver device of claim 4, wherein the instructions, when executed, further cause the transceiver device to:
generate, by the second radio transceiver at an ending of the second period, an ending pulse for transmission to the first radio transceiver; and
automatically adjust, by the first radio transceiver, the beginning of the first period during a subsequent iteration of the scan period based on delays indicated by the ending pulse.

7. The transceiver device of claim 1, wherein the instructions, when executed, further cause the transceiver device to:
generate, by each of the plurality of radio transceivers, an updated beacon data packet including (i) the beacon information captured during the first period or the second period and (ii) a channel flag indicating which advertisement channel of the plurality of advertisement channels the each of the plurality of radio transceivers was scanning when the each of the plurality of radio transceivers captured the beacon information; and
adjust (i) an antenna gain profile for at least one radio transceiver of the plurality of radio transceivers or (ii) a gain profile of the beacon data packet based on the updated beacon data packet.

8. The transceiver device of claim 1, wherein:
the scan period includes a third period;
the scan period is 500 milliseconds (ms); and
each of the first period, the second period, and the third period are one-third of 500 ms.

9. A method for synchronizing transceiver devices to simultaneously capture data across multiple advertisement channels, the method comprising:
causing a plurality of radio transceivers to scan over each of a plurality of advertisement channels during a first period of a scan period such that each of the plurality of radio transceivers scans over one of the plurality of advertisement channels that is different from other advertisement channels scanned by other radio transceivers during the first period;
during a second period of the scan period, causing the plurality of radio transceivers to scan over each of the plurality of advertisement channels such that each of the plurality of radio transceivers scans over a second one of the plurality of advertisement channels that is different from other advertisement channels scanned by other radio transceivers during the second period; and
receiving, by the plurality of radio transceivers, a beacon data packet including beacon information that is associated with a beacon device disposed proximate to the transceiver device, and wherein the beacon data packet includes beacon information captured during the first period and the second period.

10. The method of claim 9, further comprising:
during a third period of the scan period, causing the plurality of radio transceivers to scan over each of the plurality of advertisement channels such that each of the plurality of radio transceivers scans over a third one of the plurality of advertisement channels that is different from other advertisement channels scanned by other radio transceivers during the third period, and
receiving, by the plurality of radio transceivers, the beacon data packet including beacon information that is associated with the beacon device disposed proximate to the transceiver device, and wherein the beacon data packet includes beacon information captured during the first period, the second period, and the third period.

11. The method of claim 10, wherein:
the plurality of radio transceivers includes a first Bluetooth Low Energy (BLE) radio transceiver, a second BLE transceiver, and a third BLE transceiver; and
the plurality of advertisement channels includes a first BLE advertisement channel, a second BLE advertisement channel, and a third BLE advertisement channel.

12. The method of claim 9, further comprising:
generating, by a first radio transceiver at a beginning of the first period, a synchronization pulse that is transmitted to other radio transceivers of the plurality of radio transceivers; and
upon receipt of the synchronization pulse at a second radio transceiver, activating a timer configured to expire at a beginning of the second period.

13. The method of claim 12, wherein the scan period includes a third period, the plurality of radio transceivers includes a third radio transceiver, and the method further comprises:
upon receipt of the synchronization pulse at the third radio transceiver, activating a second timer configured to expire at a beginning of the third period;
at the beginning of the second period and synchronous with the timer expiring, scanning, by the second radio transceiver, an advertisement channel previously scanned by the first radio transceiver during the first period; and
at the beginning of the third period and synchronous with the second timer expiring, scanning, by the third radio transceiver, the advertisement channel previously scanned by the first radio transceiver during the first period and the second radio transceiver during the second period.

14. The method of claim 12, further comprising:
generating, by the second radio transceiver at an ending of the second period, an ending pulse for transmission to the first radio transceiver; and
automatically adjusting, by the first radio transceiver, the beginning of the first period during a subsequent iteration of the scan period based on delays indicated by the ending pulse.

15. The method of claim 9, further comprising:
generating, by each of the plurality of radio transceivers, an updated beacon data packet including (i) the beacon information captured during the first period or the second period and (ii) a channel flag indicating which advertisement channel of the plurality of advertisement channels the each of the plurality of radio transceivers was scanning when the each of the plurality of radio transceivers captured the beacon information; and
adjusting (i) an antenna gain profile for at least one radio transceiver of the plurality of radio transceivers or (ii) a gain profile of the beacon data packet based on the updated beacon data packet.

16. A non-transitory machine-readable medium comprising instructions for synchronizing transceiver devices to simultaneously capture data across multiple advertisement channels that, when executed, cause a machine to at least:
cause a plurality of radio transceivers to scan over each of a plurality of advertisement channels during a first period of a scan period such that each of the plurality of radio transceivers scans over one of the plurality of advertisement channels that is different from other advertisement channels scanned by other radio transceivers during the first period;
during a second period of the scan period, cause the plurality of radio transceivers to scan over each of the plurality of advertisement channels such that each of the plurality of radio transceivers scans over a second one of the plurality of advertisement channels that is different from other advertisement channels scanned by other radio transceivers during the second period; and receive, by the plurality of radio transceivers, a beacon data packet including beacon information that is associated with a beacon device disposed proximate to the transceiver device, and wherein the beacon data packet includes beacon information captured during the first period and the second period.

17. The non-transitory medium of claim 16, wherein the instructions, when executed, further cause the machine to: during a third period of the scan period, cause the plurality of radio transceivers to scan over each of the plurality of advertisement channels such that each of the plurality of radio transceivers scans over a third one of the plurality of advertisement channels that is different from other advertisement channels scanned by other radio transceivers during the third period; and receive, by the plurality of radio transceivers, the beacon data packet including beacon information that is associated with the beacon device disposed proximate to the transceiver device, and wherein the beacon data packet includes beacon information captured during the first period, the second period, and the third period.

18. The non-transitory of claim 16, wherein the instructions, when executed, further cause the machine to: generate, by a first radio transceiver at a beginning of the first period, a synchronization pulse that is transmitted to other radio transceivers of the plurality of radio transceivers; upon receipt of the synchronization pulse at a second radio transceiver, activate a timer configured to expire at a beginning of the second period; generate, by the second radio transceiver at an ending of the second period, an ending pulse for transmission to the first radio transceiver; and automatically adjust, by the first radio transceiver, the beginning of the first period during a subsequent iteration of the scan period based on delays indicated by the ending pulse.

19. The non-transitory of claim 18, wherein the scan period includes a third period, the plurality of radio transceivers includes a third radio transceiver, and the instructions, when executed, further cause the machine to: upon receipt of the synchronization pulse at the third radio transceiver, activate a second timer configured to expire at a beginning of the third period; at the beginning of the second period and synchronous with the timer expiring, scan, by the second radio transceiver, an advertisement channel previously scanned by the first radio transceiver during the first period; and at the beginning of the third period and synchronous with the second timer expiring, scan, by the third radio transceiver, the advertisement channel previously scanned by the first radio transceiver during the first period and the second radio transceiver during the second period.

20. The non-transitory of claim 16, wherein the instructions, when executed, further cause the machine to: generate, by each of the plurality of radio transceivers, an updated beacon data packet including (i) the beacon information captured during the first period or the second period and (ii) a channel flag indicating which advertisement channel of the plurality of advertisement channels the each of the plurality of radio transceivers was scanning when the each of the plurality of radio transceivers captured the beacon information; and adjust (i) an antenna gain profile for at least one radio transceiver of the plurality of radio transceivers or (ii) a gain profile of the beacon data packet based on the updated beacon data packet.

* * * * *